United States Patent [19]

Daftsios

[11] Patent Number: 4,963,493
[45] Date of Patent: Oct. 16, 1990

[54] EXTRACTION RACK

[76] Inventor: Athanasios C. Daftsios, 866 Waterman Rd., Ann Arbor, Mich. 48103

[21] Appl. No.: 421,745

[22] Filed: Oct. 16, 1989

[51] Int. Cl.[5] .............................................. C12M 1/00
[52] U.S. Cl. ................................... 435/287; 435/296; 435/284; 422/104; 206/569
[58] Field of Search ............... 435/287, 296, 298, 809; 422/104; 206/560, 563, 557, 558

[56] References Cited

U.S. PATENT DOCUMENTS

| 4,090,920 | 5/1978 | Studer, Jr. | 435/287 X |
| 4,178,345 | 12/1979 | Terk | 435/287 X |
| 4,246,339 | 1/1981 | Cole et al. | 435/287 |
| 4,407,958 | 10/1983 | De Graff, Jr. | 435/287 |
| 4,483,442 | 11/1984 | Worth | 206/560 X |
| 4,636,477 | 1/1987 | Rönka et al. | 206/569 X |
| 4,675,299 | 6/1987 | Witty et al. | 206/569 X |

FOREIGN PATENT DOCUMENTS 1116157 6/1968 United Kingdom ............... 206/563

Primary Examiner—Larry Jones
Attorney, Agent, or Firm—Reising, Ethington, Barnard, Perry & Milton

[57] ABSTRACT

An extraction rack assembly for liquid/liquid extraction includes a rack member (12) having a plurality of bores (14) for supporting a plurality of tubes in an upright position and a rack cover (24). The rack cover (24) includes arms (30, 32) extending therefrom which lock a sealing surface (38) against the open ends (26) of tubes (16) supported by the rack member (12) while applying a force on the sealing surface (38) of the cover member (24) for perfecting a sealing engagement against the open ends (26) of the tubes (16). The tubes are shaken and centrifuged without being removed from the device.

14 Claims, 2 Drawing Sheets

EXTRACTION RACK

TECHNICAL FIELD

The present invention provides a tube rack cover for perfecting a seal with the open ends of a plurality of tubes supported in a test tube rack. More specifically, the present invention is particularly well-suited for use with a test tube rack to perfect a seal with a plurality of tubes supported by the rack or for maintaining a plurality of caps which are disposed in the open ends of a plurality of tubes in a sealed condition during a shaking and centrifugation operation.

BACKGROUND ART

In the laboratory, test tubes or the like are most often supported in a test tube rack. The test tube rack is a support structure having a plurality of openings extending therethrough for supporting a plurality of test tubes in an upright position. The test tubes are used as extraction containers wherein solutions are added to the tubes and analytes are extracted from the aqueous into organic solvents and visa versa. Occasionally heat of solution occurs and expansion of liquids takes place within the tubes. Often this is facilitated by placing the rack supporting the test tubes in a shaking device. The tubes must be transferred to a centrifuge bucket for separation of phases via centrifugation. During the process of extraction by shaking the open ends of the tubes must be sealed.

Tubes are manufactured having threaded open end portions on which a cap can be threaded. Although these caps perfect a seal, these tubes and caps can be expensive compared to simple test tubes wherein a plug is used to seal the end portion. However, during the shaking and centrifugation operations, the expanding gases within the tube can force the plug out from the tube. The following U.S. Pat. Nos. disclose test tube rack including rack closures Design 215,491 to Pina, issued Sept. 30, 1969, U.S. Pat. Nos. 1,021,998 to Myers, issued Apr. 2, 1912, 1,121,232 to Davis, issued Dec. 15, 1914, 2,784,839 to Omer, Jr., issued Mar. 12, 1957, Design 227,180 to Brodsky, issued Jan. 5, 1973, 3,899,298 to Szczesniaka, issued Aug. 12, 1975, 4,057,148 to Myer et al., issued Nov. 8, 1977, 4,195,059 to Whitcher et al., issued Mar. 25, 1980, 4,240,547 to Taylor, issued Dec. 23, 1980, 4,510,119 to Hevey, issued Apr. 9, 1985, and 2,902,170 to Miller, issued Sept. 1, 1957. The U.S. Pat. Nos. 4,768,653 to Desai et al., issued Sept. 6, 1988 and 4,761,379 to Williams et al., issued Aug. 2, 1988 disclose examples of individual test tubes which include sealing type closure means. None of the aforementioned patents disclose any means for perfecting a seal with the open ends of the plurality of tubes supported in a rack for the purpose of extraction by shaking.

The U.S. Pat. Nos. 3,707,227 to Britt, issued Dec. 26, 1972 discloses a tray package for tubes having a flap which fits within the open end of tubes resting in the contoured bottom of the package. The Britt patent does not relate to means for perfecting a seal with the tubes when they are supported in a test tube rack, in order to provide means for maintaining the seal over the tubes when they are used in the process of liquid/liquid extraction by shaking.

The U.S. Pat. No. 1,143,488 to Bell, issued June 15, 1915 discloses a bottle or tube carrying apparatus including means for sealingly engaging corks in the open ends of the tubes. However, the rack is designed merely for storage purposes and is not well adapted for use with a centrifuge or shaking apparatus. Nor does the Bell Patent contemplate a single cover which perfects a seal with a plurality of tubes.

The U.S. Pat. No. 3,593,873 to Vonk, issued July 20, 1971 discloses a container for elongated articles, such as tubes, including a plurality of openings for retaining the tubes therein in a cover member including an inner sealing liner for engaging the tops of the tubes. There is no means disclosed in the Vonk patent for clamping the cover on the container and, therefore, the container would be ineffective for sealing tubes during a centrifugation operation.

No prior art reference discloses effective means for sealing tubes that are being shaken and then centrifuged either with or without the use of caps for maintaining the open ends of the tubes in a completely sealed condition. No prior art reference discloses a single rack which can be used for sequential shaking and centrifugation operations without the necessary removal and displacment of tubes during the operations. Further no prior art device provides a single means for sealing all tubes without requiring separate plugs for each tube.

SUMMARY OF THE INVENTION

In accordance with the present invention, there is provided an extraction rack cover including sealing surface means for engaging the open ends of a plurality of tubes supported in a rack in an upright position and arm means extending from the sealing surface means Locking means locks the arm means to the rack while applying a force on the sealing surface means perfecting a sealing engagement against the open ends of the tubes.

The present invention further provides a sheet material of the type for providing a disposable inert surface over an inner surface of a tube rack, the sheet material including a polymeric body portion and sheet retaining means for retaining the sheet body portion adjacent to and against a pad member mounted on the tube rack cover.

This pliable plastic sheet (film) is the material effecting the sealing of the test tubes during the shaking process. Advantageously, it replaces the screw caps or plugs conventionally used in this kind of laboratory operation. The entire rack, following shaking, is placed into an existing centrifuge bucket and centrifugation is carried out without the need to individually remove the test tubes into a centrifuge carrier, thus saving time and the use of expensive caps.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
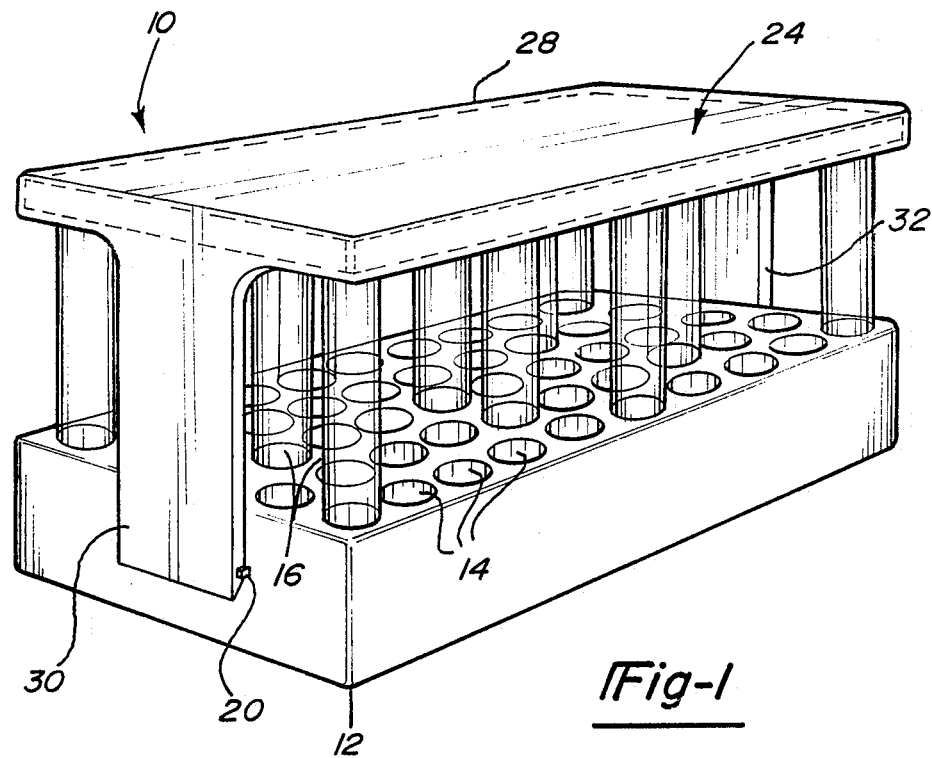
FIG. 1 is a perspective view of the present invention.
Figure 2:
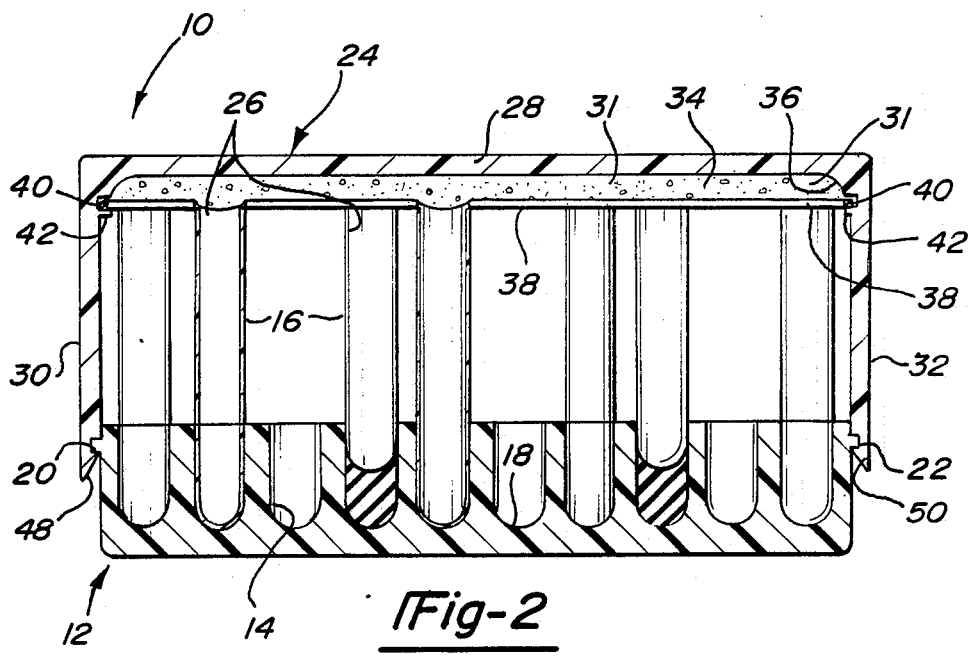
FIG. 2 is a elevational cross-sectional view of the present invention.
Figure 3:
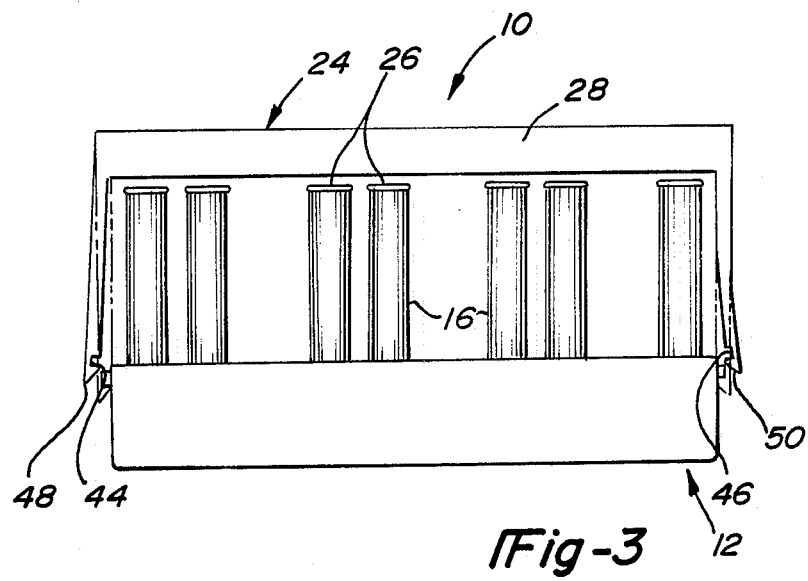
FIG. 3 is a side view of the present invention being dismounted from a test tube rack.

An extraction rack assembly constructed in accordance with the present invention is generally shown at 10 in FIGS. 1-3. The assembly 10 includes a bottom rack member generally indicated at 12. The rack member 12 is a solid member which can be made from various varieties of polymers or the like. The rack member 12 includes a plurality of bores 14 for supporting a plurality of tubes, such as test tubes 16, in an upright position The bores 14 are shown as having curved bottom portions 18 which are well suited for supporting the tubes 16 during combined shaking and centrifugation process. The rack member 12 can be shaped and sized to be supported in existing centrifugation buckets which are used to support the rack assembly 10 in a centrifuge for use during a centrifugation process. Additionally, the rack member 12 can be shaped and sized for direct placement in existing shaker devices which agitate the contents of the tube 16 during an extraction process. Of course, a single rack member 12 can be used in either process if sized and shaped accordingly. Alternatively, the rack member 12 can include adaptors for direct placement and mounting in a centrifuge without a support bucket.

The rack member 12 is an integral one-piece construction preferably molded from a polymeric material. The rack member 12 includes elongated projections 20 and 22, the function of which is described below.

A extraction rack cover constructed in accordance with the present invention is generally indicated at 24. Generally, the extraction rack cover 24 includes sealing surface means for engaging the open ends 26 of the plurality of test tubes 16 supported in the rack member 12 in an upright position. Arm means extend from the sealing surface means and locking means lock the arm means to the rack member 12 while applying a force on the sealing surface means perfecting a sealing engagement with the open ends 26 of the test tubes 16.

More specifically, the sealing surface means includes a substantially rigid shell 28 having an inner support surface 31. Arms 30 and 32 are connected to and extend from the shell 28. As shown in the drawings, the shell 28 is a molded integral member made from a polymeric material, the arms 30 and 32 being integral extensions from the shell 28. The support surface 31 is a concave portion of the rigid shell 28. The sealing surface means includes a rubber-like or foam pad member 34 disposed against the support surface 31. The device can include one or several pad members which can be stacked to change the thickness of the padded surface.

The pad member 34 is seated within the concave portion. The lateral sides 36 of the support surface 31 prevent lateral deformation of the pad member 34. Lateral deformation can occur when the pad 34 is forced against the top of the lateral-most supported tube 16, but such deformation is prevented by the side walls of 36.

The pad member 34 has an exposed deformable surface which perfects a seal with the open end 26 of the test tubes 16 when the open ends 26 of the test tubes 16 are forced thereagainst by the locking means, as described below.

A removable and disposable sheet member 38 is disposed over the exposed deformable surface of the pad member 34. The sheet member 38 provides a disposable surface which is inert to the material contained within the tubes. For example, the sheet member can be made from a polyethylene, polypropylene, or teflon material The sheet member 38 can be disposed of after each use of the assembly 10 thereby preventing contamination of the contents of tubes 16. The sheet member 38 effects the seal in lieu of a screw cap or a plug 34 and prevents contamination from the pad.

The sheet member 38 includes means for retaining the sheet member 38 adjacent to and against the pad member 34. More specifically, the sheet member 38 includes a substantially rigid edge portion 40. The shell 28 includes a flange 42 extending radially inwardly into the concave portion for engaging the rigid edge portion 40 securing the sheet member 38 against the pad member 34 disposed within the concave portion. Thus, the sheet member 38 can be force fit so that its edge portion 40 can be sandwiched between the flange 42 and pad 34. Alternatively, various other adhering means can be used to retain the sheet member in position.

As shown in FIG. 3, each of the arms 30, 32 are substantially rigid but capable of flexing outwardly away from the rack 12 by a manual operation. The locking means of the present invention includes slots 44, 46 pressed into each of the respective arms 30, 32 for engaging projections 20 and 22, respectively. The flexible arms 30, 32 bias outwardly substantially away from the shell 28 and engage the projections 20, 22 extending outwardly from the rack 12 by pressure from the fingers of the operator towards projections 20,22. The upward pressure on the shell from the tubes engaging pad 34, the pad 34 being compressed by the tubes, causes the projections 20,22 to be in a locking grip within slots 44,46. When pressure is applied on the top of the shell the slots 44,46 release the projections 20,22 and the arms 30,32 bias outwardly and release the projections 20,22. In other words, the arms 30,32 are inwardly bendable to engage projections 20,22. The arms 30,32 bias outwardly to disengage the projections 20,22 upon the slight application of either outward pressure on the arms by the operator or downward pressure on the shell.

Each of the beveled arms 30, 32 include a beveled end portion 48, 50. Upon disposing the cover member 24 over the tubes 26 and for connection with the rack member 12, contact of the beveled end portions 48, 50 against projections 20, 22 outwardly displaces arms 30, 32 to allow eventual seating of projections 20 and 22 into slots 44, 46.

As shown in FIG. 2, the assembly 10 can include plug members 52 disposed in the bores 14 for adjusting the depth of the bores 14 and normalizing the extent to which the tubes 16 extend from the bores 14. By normalizing the height of the tubes 16 extending from the bores 14, a guaranteed perfection of a seal can be obtained between the combined sheet member 38 and pad member 34 with the open ends 26 of the tubes 16.

In use, tubes 16 are placed in bores 14 randomly or in a sequential fashion. The cover member 24 is then disposed over the tubes and forced down on the tubes such that the tubes slightly depress into the pad member 34 and sheet member 38 as the projections 20 and 22 are seated in slots 44, 46. The assembly can then be placed in a shaker device for a shaking operation and then into a centrifuge for phase separation. The cover 24 is retained over the tubes 16 thereby preventing any leakage from the tubes 16 during the shaking operation and remain in the device for subsequent centrifugation.

Of course, other operations can utilize the subject assembly for perfecting the sealing of the tubes during the operation. Once the operation is completed, the cover 24 is removed as shown in FIG. 3 by downward pressure to the top edges of the cover outwardly bending arms 30, 32 to unseat projections 20, 22 from slots 44, 46.

Figure 5:
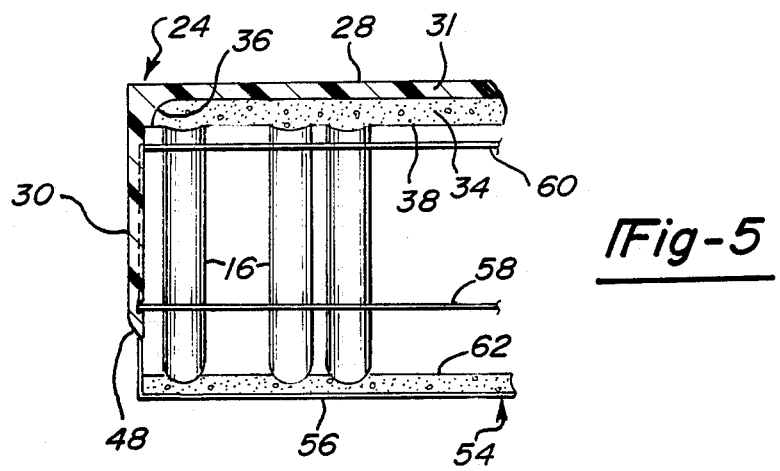
FIG. 5 is a fragmentary cross-section elevational view of the present invention mounted on a conventional test tube rack.
Figure 4:
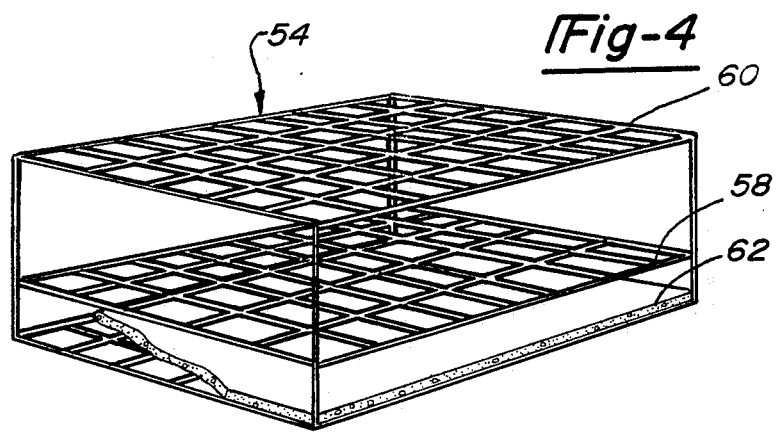
FIG. 4 is a perspective view of a conventional test tube rack having a foam pad mounted on the base portion thereof for use with the present invention.

Alternatively, the cover member 24 can be used with a conventional test tube rack, generally indicated at 54 in FIGS. 4 and 5. Generally, conventional test tube racks 54 include a bottom tube support grid 56 and a plurality of parallel spaced lattices 58 and 60 through which the tubes 16 are supported, as shown in FIG. 5.

In accordance with the present invention, slots 44 and 46 can engage the ends of lattice 58, thereby allowing the cover member 24 to function in the exact same member as it would in combination with rack member 12. To prevent the tubes 16 from being forced through the bottom grid 56 of the rack 54 or otherwise deflecting the metal wires comprising grid 56, a cushion layer 62 can be disposed over the bottom layer or wire 56. Thus, the bottom of the tubes 16 would be cushioned when force is applied by the cover member 24, as shown in FIG. 5. This is for the extraction by shaking operation only.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An extraction rack cover comprising: sealing surface means for engaging the open ends of a plurality of tubes supported in a rack in an upright position; arm means extending from said sealing surface means; and locking means for locking said arm means to the rack while applying a force on said sealing surface means perfecting a sealing engagement against the open ends of the tubes.

2. A rack cover as set forth in claim 1 including a substantially rigid shell having a support surface, said arm means being connected to and extending from said shell, said sealing surface means being disposed over and supported by said support surfaces 3. A rack cover as set forth in claim 2 wherein said support surface is a concave portion of said rigid shell, said sealing surface means being disposed within said concave portion.

4. A rack cover as set forth in claim 2 wherein said locking means includes a slot recessed into each of said arm means for engaging a portion of the tube rack, said arm means including at least two flexible arms disposed and extending from opposite sides of said shell and including said slots, said arms being inwardly bendable towards said shell to engage the portion of the rack upon being compressed inwardly and being outwardly biased away from said shell to disengage the rack.

5. A rack cover as set forth in claim 4 wherein each of said flexible arms includes a bevelled end portion.

6. An extraction rack covering comprising: sealing surface means for engaging the open ends of a plurality of tubes supported in a rack in an upright position; arm means extending from said sealing surface means; and locking means for locking said arm means to the rack while applying a force on said sealing surface means perfecting a sealing engagement against the open ends of the tubes, said sealing surface means including at least one pad member disposed against said support surface, said pad member having an exposed deformable surface which perfects a seal with the open ends of the tubes when the open ends of the tubes are forced thereagainst by said locking means.

7. A rack cover as set forth in claim 6 further including removable sheet means disposed over said exposed deformable surface of said pad member for providing a disposable surface which is inert to material contained within the tubes.

8. A rack cover as set forth in claim 7 including sheet retaining means for retaining said sheet means adjacent to and against said pad member 9. A rack cover as set forth in claim 8 wherein said sheet means includes a flexible sheet of polymeric material, said sheet retaining means including a substantially rigid edge portion of said sheet, said shell including a flange extending radially inwardly into said concave portion for engaging said rigid edge portion and securing said sheet against said pad member disposed within said concave portion.

10. An extraction rack assembly comprising: a rack member including a plurality of bores for supporting a plurality of tubes in an upright position; and a rack cover, said cover including sealing surface means for engaging the open ends of a plurality of tubes supported in said rack member in an upright position and arm means extending from said sealing surface means and locking means for locking said arm means to said rack member while applying a force on said sealing surface means perfecting a sealing engagement against the open ends of the tubes.

11. A rack assembly as set forth in claim 10 wherein said rack member includes side portions having projections extending therefrom for engagement by said locking means.

12. An extraction rack assembly comprising: a rack member including a plurality of bores for supporting a plurality of tubes in an upright position; a rack cover, said cover including sealing surface means for engaging the open ends of a plurality of tube supported in said rack member in an upright position and arm means extending from said sealing surface means and locking means for locking said arm means to said rack member while applying a force on said sealing surface means perfecting a sealing engagement against the open ends of the tubes; and plug members disposed in said bores for adjusting the depth of said bores and normalizing the extent to which the tubes extend from said bores.

13. A sheet material of the type for providing a disposable inert surface over an inner surface of a tube rack cover, said sheet material comprising: a polymeric body portion, and sheet retaining means for retaining said body portion adjacent to and against a pad member mounted on the tube rack cover.

14. A sheet material as set forth in claim 13 wherein said sheet retaining means includes a rigid edge portion of said polymeric body portion for being engaged by and supported between the pad member and a flange extending from the tube rack cover.

* * * * *